United States Patent
Chaparala

(10) Patent No.: US 10,195,825 B2
(45) Date of Patent: Feb. 5, 2019

(54) METHODS FOR STRENGTHENING THE EDGE OF LAMINATED GLASS ARTICLES AND LAMINATED GLASS ARTICLES FORMED THEREFROM

(71) Applicant: Corning Incorporated, Corning, NY (US)

(72) Inventor: Satish Chandra Chaparala, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/521,662

(22) PCT Filed: Oct. 29, 2015

(86) PCT No.: PCT/US2015/057930
§ 371 (c)(1),
(2) Date: Apr. 25, 2017

(87) PCT Pub. No.: WO2016/069824
PCT Pub. Date: May 6, 2016

(65) Prior Publication Data
US 2017/0246841 A1    Aug. 31, 2017

Related U.S. Application Data

(60) Provisional application No. 62/072,665, filed on Oct. 30, 2014.

(51) Int. Cl.
*B32B 3/00* (2006.01)
*B32B 17/06* (2006.01)
(Continued)

(52) U.S. Cl.
CPC .......... *B32B 17/06* (2013.01); *B24C 1/04* (2013.01); *B32B 3/02* (2013.01); *C03B 17/02* (2013.01);
(Continued)

(58) Field of Classification Search
CPC ...... C03C 23/007; B32B 2250/03; B24C 1/04
See application file for complete search history.

(56) References Cited

U.S. PATENT DOCUMENTS

| 1,705,631 A | 3/1929 | Bartelstone |
| 4,023,953 A | 5/1977 | Megles, Jr. et al. |

(Continued)

FOREIGN PATENT DOCUMENTS

| CN | 101076447 A | 11/2007 |
| CN | 102403466 A | 4/2012 |

(Continued)

OTHER PUBLICATIONS

Huang et al; "Direct Welding of Fused Silica With Femtosecond Fiber Laser"; Proc. of SPIE vol. 8244; 824403-1-824403-9.
(Continued)

*Primary Examiner* — Elizabeth E Mulvaney

(57) ABSTRACT

A method for strengthening an edge of a glass laminate including a glass core layer positioned between a first glass clad layer and a second glass clad layer may include forming a channel in the edge of the glass laminate. Sidewalls of the channel may be formed from the first glass clad layer and the second glass clad layer. Glass filler material having a filler coefficient of thermal expansion greater than a core coefficient of thermal expansion may be positioned in the channel. The glass filler material and the sidewalls of the channel may be fused to the second glass clad layer thereby forming an edge cap over the channel. The edge of the glass laminate is under compressive stress after the glass filler material is enclosed in the channel.

18 Claims, 7 Drawing Sheets

(51) Int. Cl.
*C03C 15/00* (2006.01)
*C03B 17/02* (2006.01)
*C03B 23/203* (2006.01)
*B24C 1/04* (2006.01)
*C03C 3/085* (2006.01)
*C03C 3/087* (2006.01)
*C03C 3/091* (2006.01)
*C03C 3/093* (2006.01)
*C03C 8/02* (2006.01)
*C03C 19/00* (2006.01)
*C03C 23/00* (2006.01)
*B32B 3/02* (2006.01)
*C03B 17/06* (2006.01)
*C03C 13/00* (2006.01)

(52) U.S. Cl.
CPC .......... *C03B 17/064* (2013.01); *C03B 23/203* (2013.01); *C03C 3/085* (2013.01); *C03C 3/087* (2013.01); *C03C 3/091* (2013.01); *C03C 3/093* (2013.01); *C03C 8/02* (2013.01); *C03C 13/00* (2013.01); *C03C 15/00* (2013.01); *C03C 19/00* (2013.01); *C03C 23/005* (2013.01); *C03C 23/0025* (2013.01); *B32B 2250/03* (2013.01); *B32B 2307/558* (2013.01); *B32B 2419/00* (2013.01); *B32B 2457/12* (2013.01); *B32B 2457/208* (2013.01); *B32B 2509/00* (2013.01); *B32B 2605/00* (2013.01); *C03C 2207/00* (2013.01); *C03C 2213/00* (2013.01)

(56) References Cited

U.S. PATENT DOCUMENTS

| | | | |
|---|---|---|---|
| 4,214,886 A | 7/1980 | Shay et al. | |
| 4,801,488 A | 1/1989 | Smith | |
| 6,709,750 B1 | 3/2004 | Pohlmann et al. | |
| 8,287,995 B2 | 10/2012 | Shibuya et al. | |
| 2007/0007894 A1 | 1/2007 | Aitken et al. | |
| 2011/0014731 A1 | 1/2011 | Nguyen et al. | |
| 2012/0131959 A1 | 5/2012 | No et al. | |
| 2012/0147538 A1 | 6/2012 | Kawanami et al. | |
| 2014/0216108 A1 | 8/2014 | Wiegel et al. | |
| 2015/0368141 A1 | 12/2015 | Bergman et al. | |
| 2016/0152006 A1 | 6/2016 | Boek et al. | |
| 2017/0355633 A1 | 12/2017 | Cook et al. | |

FOREIGN PATENT DOCUMENTS

| | | |
|---|---|---|
| CN | 102690046 A | 9/2012 |
| CN | 102971264 A | 3/2013 |
| CN | 103702952 A | 4/2014 |
| JP | 2001177082 A | 6/2001 |
| WO | 2013130665 A2 | 6/2013 |
| WO | 2014160534 A1 | 10/2014 |

OTHER PUBLICATIONS

Lou et al; "Additive Manufacturing of Glass"; Journal of Manufacturing Science and Engineering, Received Apr. 22, 2014; Accepted Manuscript Posted Sep. 11, 2014; 31 Pages.

Bagger et al; "Review of Laser Hybrid Welding"; Journal of Laser Application, vol. 17, No. 1; Feb. 2005; pp. 1-14.

Mackwood et al; "Thermal Modelling of Laser Welding and Related Processes: A Literature Review"; Optics & Laser Technology; 37; (2005) pp. 99-115.

English Translation of CN201580071980.7 Notice of First Office Action dated Sep. 18, 2018; 6 Pages; Chinese Patent Office.

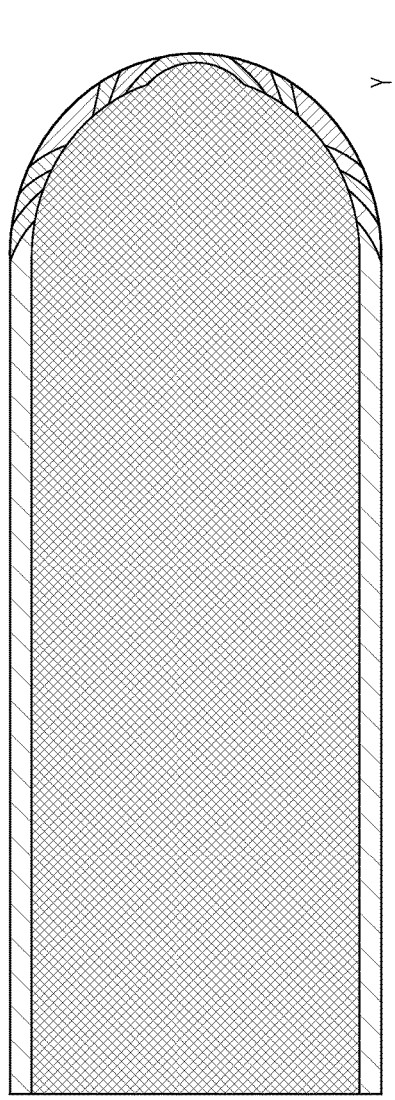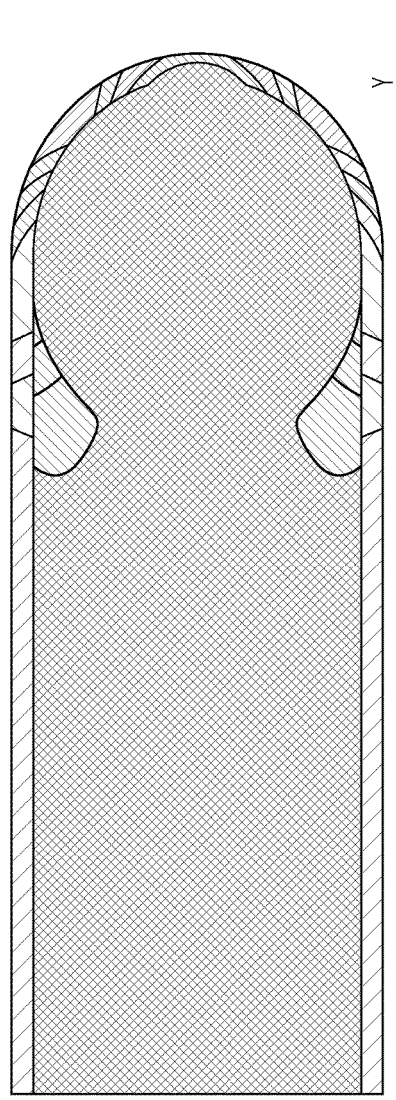
FIG. 9A
FIG. 9B

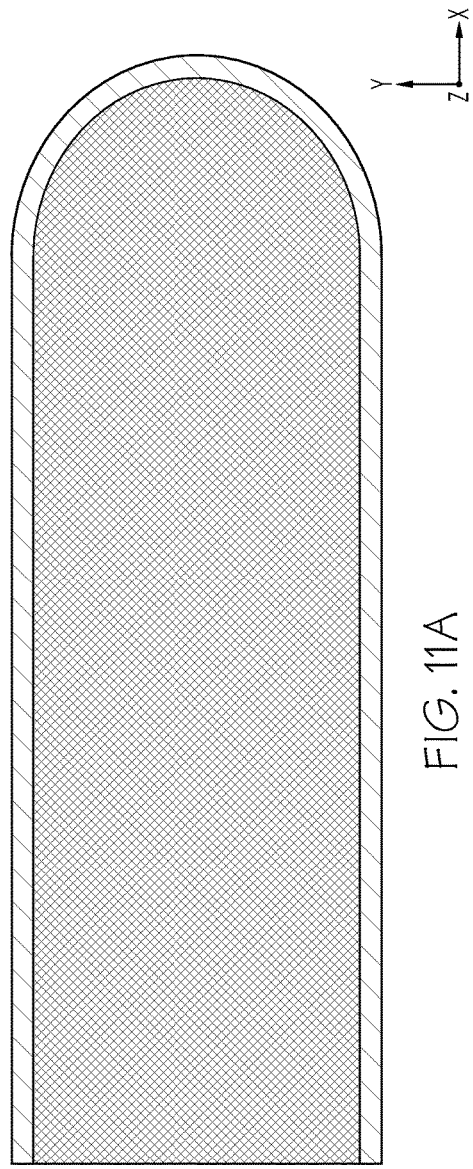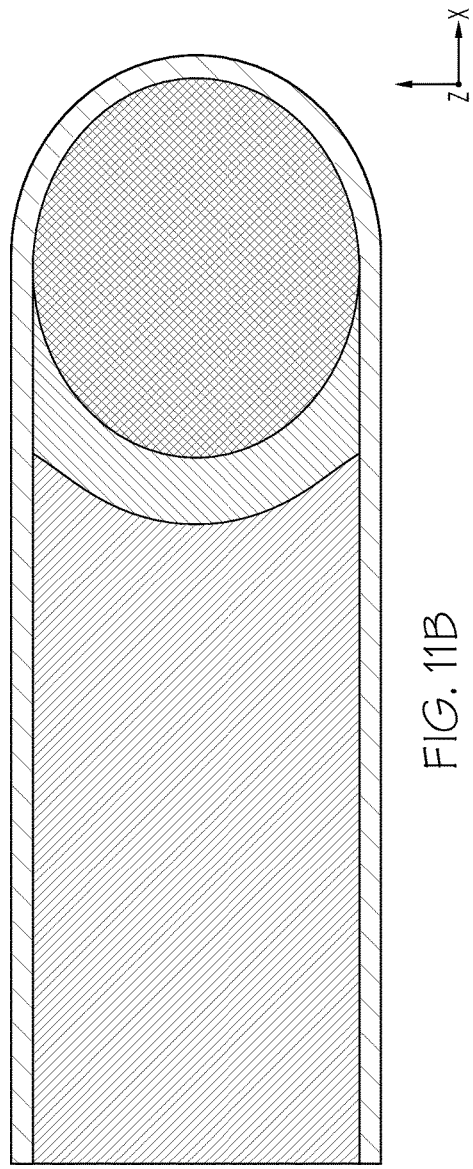
FIG. 11A
FIG. 11B

METHODS FOR STRENGTHENING THE EDGE OF LAMINATED GLASS ARTICLES AND LAMINATED GLASS ARTICLES FORMED THEREFROM

This application claims the benefit of priority to International Application No. PCT/US2015/057930, filed on Oct. 29, 2015, which claims the benefit of priority to U.S. Application No. 62/072,665, filed on Oct. 30, 2014, the content of which is incorporated herein by reference in its entirety.

BACKGROUND

Field

The present specification generally relates to laminated glass articles and, more specifically, to methods for strengthening the edge of laminated glass articles and laminated glass articles formed therefrom.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Strengthened glass articles may be formed from processes such as chemical tempering, thermal tempering, and lamination. A glass article strengthened by lamination is formed from at least two glass compositions which have different coefficients of thermal expansion. These glass compositions are brought into contact with one another in a molten state to form the glass article and fuse or laminate the glass compositions together. As the glass compositions cool, the difference in the coefficients of thermal expansion cause compressive stresses to develop in at least one of the layers of glass, thereby strengthening the glass article. Lamination processes can also be used to impart or enhance other properties of laminated glass articles, including physical, optical, and chemical properties Various processes may be utilized to produce laminated glass articles, including the fusion lamination process which yields a continuous ribbon of laminated glass. Discrete laminated glass articles may be singulated from the continuous ribbon of laminated glass for incorporation in other devices. However, after singulation, the central core layer of the glass article is exposed at the edge of the laminated glass article. The exposed core layer, which may be under tension, may make the laminated glass article susceptible to failure from damage incident on the edge of the laminated glass article.

Accordingly, a need exists for alternative methods for strengthening the edge of laminated glass articles and laminated glass articles formed therefrom.

SUMMARY

According to one embodiment, a method for strengthening an edge of a glass laminate may include forming a channel in the edge of the glass laminate, the glass laminate comprising a glass core layer positioned between a first glass clad layer and a second glass clad layer, sidewalls of the channel being formed from at least a portion of the first glass clad layer and at least a portion of the second glass clad layer. Thereafter, a glass filler material may be positioned in the channel, the glass filler material having a filler coefficient of thermal expansion $CTE_F$ that is greater than a core coefficient of thermal expansion $CTE_V$ of the glass core layer. The glass filler material and the sidewalls of the channel may then be heated to a temperature greater than or equal to a softening temperature of the glass filler material and greater than or equal to a softening temperature of the sidewalls. The glass filler material is enclosed in the channel by joining the sidewalls and fusing at least a portion of the first glass clad layer to at least a portion of the second glass clad layer thereby forming an edge cap over the channel, wherein the edge of the glass laminate is under compressive stress after the glass filler material is enclosed in the channel.

In another embodiment, a laminated glass article may include a glass core layer having a core coefficient of thermal expansion $CTE_C$. The laminated glass article may also include a first glass clad layer fused directly to a first surface of the glass core layer and a second glass clad layer fused directly to a second surface of the glass core layer opposite the first surface. The first glass clad layer and the second glass clad layer may be fused to one another adjacent an edge of the glass core layer forming an edge cap that encloses at least a portion of the edge of the glass core layer. A glass filler material having a filler coefficient of thermal expansion $CTE_F$ may be positioned between the edge of the glass core layer and the edge cap and fused to both the glass core layer and the edge cap. $CTE_F$ may be greater than $CTE_C$.

Additional features and advantages of the methods and laminated glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 9a and 9b graphically depict a map of the axial stresses in the x-direction for a laminated glass article processed according to conventional edge processing techniques (FIG. 9a) and edge processing techniques according to one or more embodiments shown and described herein (FIG. 9b);

FIGS. 11a and 11b graphically depict a map of the axial stresses in the z-direction for a laminated glass article processed according to conventional edge processing techniques (FIG. 11a) and edge processing techniques according to one or more embodiments shown and described herein (FIG. 11b).

DETAILED DESCRIPTION

Figure 1:
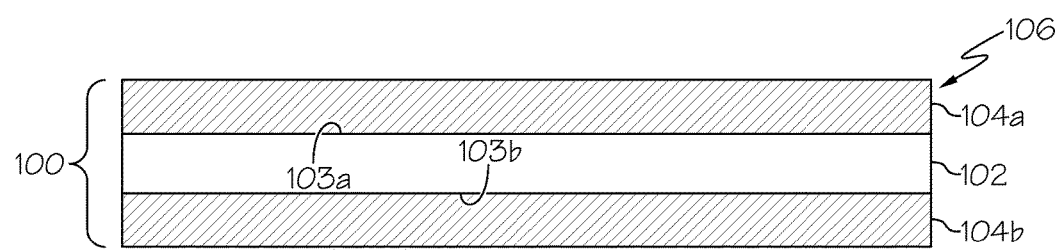
FIG. 1 schematically depicts a cross section of a laminated glass article according to one or more embodiments shown and described herein.

Reference will now be made in detail to embodiments of methods of strengthening the edges of laminated glass articles and glass articles formed therefrom, examples of which are illustrated in the accompanying drawings. Whenever possible, the same reference numerals will be used throughout the drawings to refer to the same or like parts. One embodiment of a method for strengthening an edge of a laminated glass article is schematically depicted in FIGS. 3-6. In embodiments, the laminated glass article may be strengthened by forming a channel in the edge of the glass laminate, the glass laminate comprising a glass core layer positioned between a first glass clad layer and a second glass clad layer, sidewalls of the channel being formed from at least a portion of the first glass clad layer and at least a portion of the second glass clad layer. Thereafter, a glass filler material may be positioned in the channel, the glass filler material having a filler coefficient of thermal expansion $CTE_F$ that is greater than a core coefficient of thermal expansion $CTE_C$ of the glass core layer. The glass filler material and the sidewalls of the channel may then be heated to a temperature greater than or equal to a softening temperature of the glass filler material and greater than or equal to a softening temperature of the sidewalls. The glass filler material is enclosed in the channel by joining the sidewalls and fusing at least a portion of the first glass clad layer to at least a portion of the second glass clad layer thereby forming an edge cap over the channel, wherein the edge of the glass laminate is under compressive stress after the glass filler material is enclosed in the channel. Various embodiments of methods for strengthening the edges of laminated glass articles and laminated glass articles formed therefrom will be described herein with specific reference to the appended drawings.

The term "CTE," as used herein, refers to the coefficient of thermal expansion of the glass composition averaged over a temperature range from about 20° C. to about 300° C.

The term "softening point," as used herein, refers to the temperature at which the viscosity of the glass composition is $1 \times 10^{7.6}$ poise.

The terms "strain point" and "$T_{strain}$" as used herein, refers to the temperature at which the viscosity of the glass composition is $3 \times 10^{11}$ poise.

Referring now to FIG. 1, a laminated glass article 100 is schematically depicted in cross section. The laminated glass article 100 generally comprises a glass core layer 102 and at least one glass clad layer 104a. In the embodiment of the laminated glass article 100 shown in FIG. 1 the laminated glass article includes a first glass clad layer 104a and a second glass clad layer 104b positioned on opposite sides of the glass core layer 102. While FIG. 1 schematically depicts the laminated glass article 100 as being a laminated glass sheet, it should be understood that other configurations and form factors are contemplated and possible. For example, the laminated glass article may have a non-planar configuration such as a curved glass sheet or the like. Alternatively, the laminated glass article may be a laminated glass tube, container, or the like.

In the embodiment of the laminated glass article 100 depicted in FIG. 1, the glass core layer 102 generally comprises a first surface 103a and a second surface 103b which is opposed to the first surface 103a. A first glass clad layer 104a is fused to the first surface 103a of the glass core layer 102 and a second glass clad layer 104b is fused to the second surface 103b of the glass core layer 102. The glass clad layers 104a, 104b are fused to the glass core layer 102 without any additional non-glass materials, such as adhesives, coating layers or the like, being disposed between the glass core layer 102 and the glass clad layers 104a, 104b. Thus, in some embodiments, the glass clad layers 104a, 104b are fused directly to the glass core layer 102 or are directly adjacent to the glass core layer. In some embodiments, the laminated glass article 100 comprises one or more intermediate layers disposed between the glass core layer and the glass clad layer(s). For example, the intermediate layers may comprise intermediate glass layers and/or diffusion layers formed at the interface of the glass core layer and the glass clad layer(s) (e.g., by diffusion of one or more components of the glass core and glass clad layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

In the embodiments of the laminated glass articles described herein, the composition of the glass clad layers 104a, 104b is different than the composition of the glass core layer 102 to achieve specific attributes in the final laminated glass article. For example, in the embodiments described herein, the glass clad layers 104a, 104b are formed from glass compositions which have an average clad coefficient of thermal expansion $CTE_{CL}$ and the glass core layer 102 is formed from a different glass composition which has an average core coefficient of thermal expansion $CTE_C$. The $CTE_C$ is greater than $CTE_{CL}$ (i.e., $CTE_C>CTE_{CL}$) which results in the glass clad layers 104a, 104b being compressively stressed without being ion-exchanged or thermally tempered.

For example, in some embodiments, the glass clad layers are formed from glass compositions which have average clad $CTE_{CL}$ less than or equal to about $40\times10^{-7}/°$ C. averaged over a range from 20° C. to 300° C. In some embodiments, the average clad $CTE_{CL}$ of the clad glass compositions may be less than or equal to about $37\times10^{-7}/°$ C. averaged over a range from 20° C. to 300° C. In yet other embodiments, the average clad $CTE_{CL}$ of the clad glass compositions may be less than or equal to about $35\times10^{-7}/°$ C. averaged over a range from 20° C. to 300° C. However, the glass core layer may be formed from glass compositions which have an average coefficient of thermal expansion which is greater than or equal to about $40\times10^{-7}/°$ C. in a range from 20° C. to 300° C. In some of these embodiments, the average core $CTE_C$ of the core glass composition of the glass core layer may be greater than or equal to about $60\times10^{-7}/°$ C. in a range from 20° C. to 300° C. In yet other embodiments, the average core $CTE_C$ of the glass composition of the glass core layer may be greater than or equal to about $80\times10^{-7}/°$ C. averaged over a range from 20° C. to 300° C. In yet other embodiments, the average core $CTE_C$ of the glass composition of the glass core layer may be greater than or equal to about $90\times10^{-7}/°$ C. averaged over a range from 20° C. to 300° C.

In the embodiments described herein, the CTE differential between the glass core layer 102 and the glass clad layers 104a, 104b (i.e., $|CTE_C-CTE_{CL}|$) is sufficient to generate a compressive stress in the clad layers. In some embodiments the CTE differential between the glass core layer and the glass clad layers is greater than or equal to about $20\times10^{-7}/°$ C. or even $30\times10^{-7}/°$ C. In some other embodiments, the CTE differential between the glass core layer and the glass clad layers is greater than or equal to about $40\times10^{-7}/°$ C. or even $50\times10^{-7}/°$ C. In yet other embodiments, the CTE differential between the glass core layer and the glass clad layers is greater than or equal to about $60\times10^{-7}/°$ C. or even $65\times10^{-7}/°$ C.

In some embodiments, one or more of the glass clad layers 104a, 104b may be formed from a glass composition which is less soluble in a particular solution than the glass composition from which the glass core layer 102 is formed, as described in co-pending International Patent Application No. PCT/US2014/042237 filed Jun. 13, 2014 and entitled "Method of Manufacturing Laminated Glass Articles with Improved Edge Condition," which is incorporated herein by reference. This enables a portion of the glass core layer 102 to be selectively removed, such as by chemical etching, while the glass clad layers 104a, 104b remain substantially unaffected. In still other embodiments, the glass clad layers 104a, 104b may contain additional constituent components which alter the optical characteristics of the glass clad layers 104a, 104b relative to the glass core layer. Accordingly, it should be understood that the composition of at least one of the glass clad layers 104a, 104b is different than the composition of the glass core layer 102 to which it is fused.

In some embodiments, the glass core layer may be formed from one of the glass core layer compositions listed in Tables 1A and 1B below. However, it should be understood that other compositions for the glass core layer 102 are contemplated and possible.

TABLE 1A

Exemplary Glass Core Layer Compositions

| | 1-1 | 1-2 | 1-3 | 1-4 | 1-5 | 1-6 | 1-7 |
|---|---|---|---|---|---|---|---|
| $SiO_2$ | 61.97 | 66.54 | 63.46 | 69.05 | 56.12 | 59.05 | 56.24 |
| $Al_2O_3$ | 10.89 | 10.03 | 9.56 | 10.2 | 16.73 | 15.1 | 14.38 |
| $B_2O_3$ | 10.09 | 6 | 7.09 | | 10.5 | 6.26 | 7.16 |
| $Na_2O$ | 0.07 | 0.09 | 0.09 | 15.13 | 0.064 | 0.086 | 0.084 |
| $K_2O$ | 2.17 | 5.79 | 5.79 | | 3.084 | 8.059 | 8.042 |
| MgO | 6.16 | 1.9 | 2.49 | 5.49 | 3.74 | 1.13 | 1.48 |
| CaO | 5.45 | 6.23 | 7.41 | | 4.61 | 5.16 | 6.13 |
| SrO | 3.09 | 3.28 | 3.95 | | 4.83 | 5.02 | 6.04 |
| BaO | 0.03 | 0.04 | 0.04 | | 0.08 | 0.08 | 0.1 |
| $SnO_2$ | 0.04 | 0.07 | 0.07 | 0.13 | 0.092 | 0.151 | 0.164 |
| $ZrO_2$ | 0.01 | 0.02 | 0.03 | | 0.023 | 0.032 | 0.051 |
| $Fe_2O_3$ | 0.01 | 0.01 | 0.01 | | 0.033 | 0.031 | 0.032 |
| $As_2O_3$ | | | | | 0.0002 | 0.0002 | 0.0002 |
| CTE ($\times10^{-7}$ C.$^{-1}$) | | | | | 43.9 | 59.8 | 54.9 |

TABLE 1B

Exemplary Glass Core Layer Compositions

| | 1-8 | 1-9 | 1-10 |
|---|---|---|---|
| $SiO_2$ | 67.45 | 69.17 | 68.84 |
| $Al_2O_3$ | 12.69 | 8.53 | 10.63 |
| $B_2O_3$ | 3.67 | | |
| $Na_2O$ | 13.67 | 13.94 | 14.86 |
| $K_2O$ | 0.02 | 1.17 | 0.02 |
| MgO | 2.36 | 6.45 | 5.43 |
| CaO | 0.03 | 0.54 | 0.04 |
| SrO | | | |
| BaO | | | |
| $SnO_2$ | 0.09 | 0.19 | 0.17 |
| $ZrO_2$ | 0.01 | | |
| $Fe_2O_3$ | 0.01 | | |
| $As_2O_3$ | | | |
| CTE ($\times10^{-7}$C.$^{-1}$) | 74.6 | 83.6 | 80.1 |

In some embodiments, the glass clad layers may be formed from one or more of the glass clad layer compositions listed in Table 2 below. However, it should be understood that other compositions for the glass clad layers 104a, 104b are contemplated and possible.

TABLE 2

Exemplary Glass Clad Layer Compositions

| | 2-1 | 2-2 | 2-3 | 2-4 | 2-5 | 2-6 | 2-7 |
|---|---|---|---|---|---|---|---|
| $SiO_2$ | 69.44 | 67.55 | 62.93 | 64.59 | 60.48 | 62.39 | 67.29 |
| $Al_2O_3$ | 12.36 | 11 | 10.74 | 7.38 | 11.55 | 17.21 | 6.47 |
| $B_2O_3$ | 4.35 | 9.83 | 13.16 | 16.45 | 17.6 | 10.5 | 20.99 |
| $Na_2O$ | | | | | 0.05 | | |
| $K_2O$ | | | | | 0.022 | | |
| MgO | 4.01 | 2.26 | 3.58 | 2.21 | 1.38 | 1.41 | 0.35 |
| CaO | 5.98 | 8.73 | 7.32 | 8.14 | 7.01 | 7.51 | 4.49 |
| SrO | 1.73 | 0.52 | 2.17 | 1.11 | 1.86 | 0.83 | 0.29 |
| BaO | 1.98 | | 0.01 | 0.01 | 0.02 | | 0.01 |
| $SnO_2$ | 0.1 | 0.07 | 0.07 | 0.06 | 0.208 | 0.16 | 0.05 |
| $ZrO_2$ | 0.03 | 0.02 | | | 0.14 | | 0.05 |
| $Fe_2O_3$ | 0.02 | 0.01 | 0.01 | 0.01 | 0.039 | | 0.01 |
| $As_2O_3$ | | | | | 0.0004 | | |
| CTE ($\times10^{-7}$ C.$^{-1}$) | | | | | 35.6 | 31.7 | 30.9 |

A variety of processes may be used to produce the laminated glass articles described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

Figure 2:
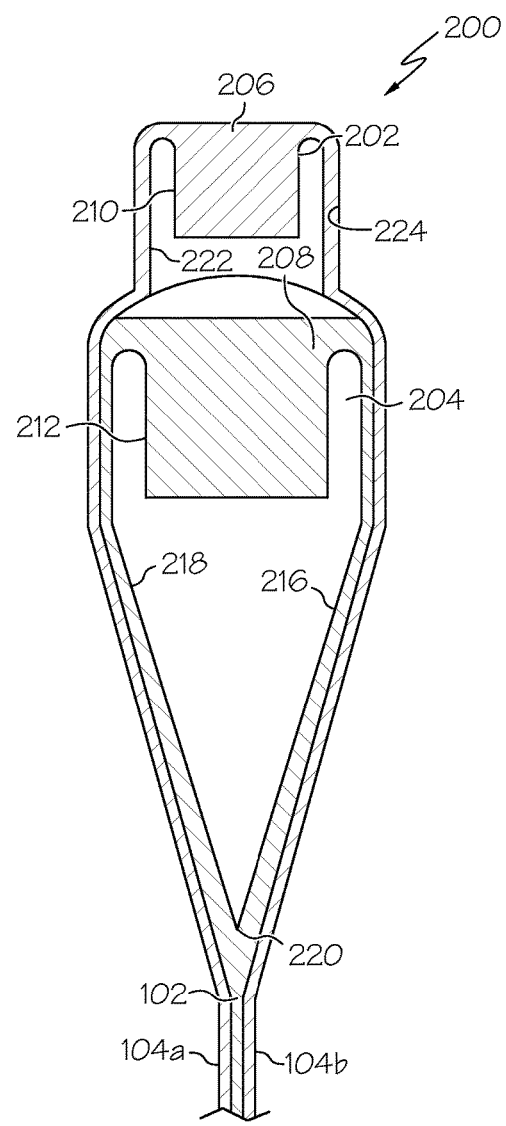
FIG. 2 schematically depicts an apparatus for forming a laminated glass article according to one or more embodiments shown and described herein.

In one particular embodiment, the laminated glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass clad composition 206 is fed from a melter (not shown). Similarly, the lower overflow distributor 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 102 of a laminated glass article.

Simultaneously, the molten glass clad composition 206 overflows the trough 210 formed in the upper overflow distributor 202 and flows over outer forming surfaces 222, 224 of the upper overflow distributor 202. The molten glass clad composition 206 is outwardly deflected by the upper overflow distributor 202 such that the molten glass clad composition 206 flows around the lower overflow distributor 204 and contacts the molten glass core composition 208 flowing over the outer forming surfaces 216, 218 of the lower overflow distributor, fusing to the molten glass core composition and forming glass clad layers 104a, 104b around the glass core layer 102.

While FIG. 2 schematically depicts a particular apparatus for forming planar laminated glass articles such as sheets or ribbons, it should be appreciated that other geometrical configurations are possible. For example, cylindrical laminated glass articles may be formed, for example, using the apparatuses and methods described in U.S. Pat. No. 4,023,953.

In some embodiments, the molten glass core composition 208 generally has an average core coefficient of thermal expansion $CTE_C$ which is greater than the average clad coefficient of thermal expansion $CTE_{CL}$ of the molten glass clad composition 206. Accordingly, as the glass core layer 102 and the glass clad layers 104a, 104b cool, the difference in the coefficients of thermal expansion of the glass core layer 102 and the glass clad layers 104a, 104b cause a compressive stresses to develop in the glass clad layers 104a, 104b. The compressive stress increases the strength of the resulting laminated glass article.

In some other embodiments, the molten glass core composition 208 generally has an average core coefficient of thermal expansion $CTE_C$ which is similar to the average clad coefficient of thermal expansion $CTE_{CL}$ of the molten glass clad composition 206. In this embodiment, after the glass core layer 102 and the glass clad layers 104a, 104b cool and solidfy, the resulting laminated glass article may undergo further processing, such as by heat treatment or the like, in order to ceram at least one of the glass core layer 102 and/or the glass clad layers 104a, 104b which, in turn, changes the CTE of the layer and results in compressive stress being formed in the glass clad layers 104a, 104b of the laminated glass article. For example, in one embodiment, the glass core layer 102 may be formed from a glass ceramic material which precipitates a crystalline phase upon heat treatment, thereby increasing the core coefficient of thermal expansion $CTE_C$ relative to the glass clad layers 104a, 104b. The resulting difference in the coefficient of thermal expansion causes compressive stress to develop in the glass clad layers 104a, 104b. In another embodiment, the glass clad layers 104a, 104b may be formed from a glass ceramic material which precipitates a crystalline phase upon heat treatment, thereby decreasing the clad coefficient of thermal expansion $CTE_{CL}$ relative to the glass core layer 102. The resulting difference in the coefficient of thermal expansion causes compressive stress to develop in the glass clad layers 104a, 104b.

Referring again to FIG. 1, as noted herein, the method of forming the laminated glass article by the fusion process initially result in a continuous ribbon of glass (or a continuous cylinder of glass in the case of glass tubing). Thus, discrete laminated glass articles can be singulated or separated from the continuous ribbon of glass. Upon separation from the continuous ribbon of glass, the core layer of the glass article is exposed. In embodiments where the laminated glass article 100 is strengthened, either during formation or as a result of ceramming after formation, the glass clad layers 104a, 104b exposed at the edge 106 of the laminated glass article 100 are in compression due to strengthening while the glass core layer 102 exposed at the edge 106 of the laminated glass article is in tension. Because of this tensile stress in the glass core layer 102, the glass core layer 102 is particularly susceptible to damage which may lead to catastrophic failure (i.e., complete fracture) of the laminated glass article 100.

To strengthen the edge 106 of the laminated glass article and reduce its susceptibility to failure, the edge 106 of the laminated glass article 100 may be further processed. Methods of processing the edge 106 of the laminated glass article to improve its strength and reduce its susceptibility to failure will now be described in detail.

Figure 3:
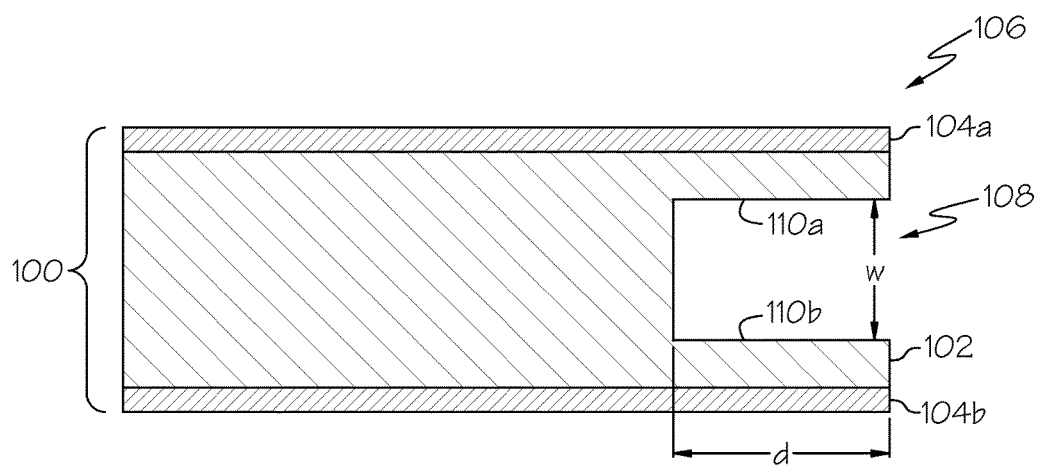
FIG. 3 schematically depicts one embodiment of a laminated glass article with a channel formed in the edge of the laminated glass article.

Referring now to FIG. 3, the edge 106 of the laminated glass article 100 is processed to increase the strength of the edge 106 of the laminated glass article 100 by first forming a channel 108 in the edge 106 of the laminated glass article 100. The channel 108 may be formed by removing at least a portion of the glass core layer 102. For example, in some embodiments, only a portion of the glass core layer 102 is removed to a depth d from the edge 106 of the glass article such that the sidewalls 110a, 110b of the channel are formed from a portion of the glass core layer 102 and portions of the glass clad layers 104a, 104b. In some other embodiments (not shown), the entire glass core layer 102 is removed to the depth d such that the sidewalls 110a, 110b of the channel 108 are formed by only the glass clad layers 104a, 104b.

In the embodiments described herein, the dimensions of the channel 108 (i.e., the depth d and the width W) are sufficiently sized to allow for a tertiary glass material, specifically a glass filler material 112 (FIG. 4), to be inserted into the channel 108 and sealed in the channel 108 by utilizing the sidewalls 110a, 110b to form and edge cap 130 (FIG. 9), as will be described in further detail herein.

In embodiments, the channel 108 may extend along the entire edge in which the glass core layer 102 is exposed. For example, where the laminated glass article 100 is a laminated glass plate in which the glass core layer 102 is exposed at the entire perimeter edge of the plate, the channel 108 may be formed in the entire perimeter edge of the plate. Alternatively, in embodiments where the laminated glass article is a laminated glass cylinder, the channel may be formed in the entire circumference of each free end of the cylinder.

In some embodiments, the channel 108 may be formed by mechanically removing a portion of the glass core layer 102 from the laminated glass article 100, such as by machining, grinding, diamond turning, or the like. In some other embodiments, the channel 108 may be formed by laser ablation which is used to selectively remove portions of the glass core layer and glass clad layers, as necessary.

Alternatively, the channel 108 may be formed by chemical processes, such as by preferentially etching or dissolving the glass core layer 102. For example, in one embodiment, the glass core layer 102 may be formed from a glass composition which has a greater solubility in a particular etching solution than the glass clad layers 104a, 104b, as described hereinabove. In this embodiment, the channel 108 may be formed by preferentially dissolving a portion of the glass core layer 102, leaving behind the glass clad layers 104a, 104b to form the sidewalls 110a, 110b of the channel 108. Suitable glass compositions for forming laminated glass articles amenable to selective etching and etching solutions for forming the channel 108 in the laminated glass articles 100 are disclosed in co-pending International Patent Application No. PCT/US2014/042237 filed Jun. 13, 2014 and entitled "Method of Manufacturing Laminated Glass Articles with Improved Edge Condition,", the entirety of which is incorporated by reference herein.

Figure 4:
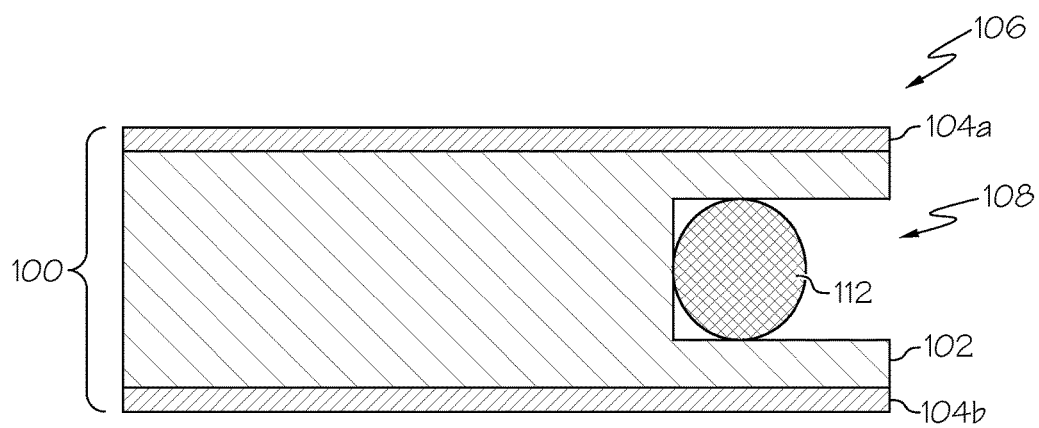
FIG. 4 schematically depicts the laminated glass article of FIG. 3 with a glass filler material, specifically a glass fiber, disposed in the channel formed in the edge of the laminated glass article.

Referring now to FIG. 4, once the channel 108 is formed in the laminated glass article 100, a glass filler material 112 is inserted in the channel 108. In the embodiments described herein, the glass filler material 112 has a filler coefficient of thermal expansion $CTE_F$ which is greater than the clad coefficient of thermal expansion $CTE_{CL}$ of the glass clad layers 104a, 104b and greater than the core coefficient of thermal expansion $CTE_C$ of the glass core layer 102. Accordingly, it should be understood that $CTE_F > CTE_C > CTE_{CL}$. In the embodiments described herein, the glass filler material 112 has a coefficient of thermal expansion which is at least $10 \times 10^{-7}/°$ C. greater than the core coefficient of thermal expansion $CTE_C$. In some embodiments, the glass filler material 112 has a coefficient of thermal expansion which is at least $15 \times 10^{-7}/°$ C. greater than the core coefficient of thermal expansion $CTE_C$ or even $20 \times 10^{-7}/°$ C. greater than the core coefficient of thermal expansion $CTE_C$. For example, in some embodiments, the glass filler material may have an average filler coefficient of thermal expansion $CTE_F$ of greater than or equal to $60 \times 10^{-7}/°$ C. in a range from 20° C. to 300° C. In yet other embodiments, the average filler $CTE_F$ of the glass composition of the glass filler material may be greater than or equal to about $70 \times 10^{-7}/°$ C. averaged over a range from 20° C. to 300° C. In yet other embodiments, the average filler $CTE_F$ of the glass filler material may be greater than or equal to about $80 \times 10^{-7}/°$ C. or even greater than or equal to $90 \times 10^{-7}/°$ C. averaged over a range from 20° C. to 300° C. In still other embodiments, the average filler $CTE_F$ of the glass filler material may be greater than or equal to about $95 \times 10^{-7}/°$ C. or even greater than or equal to $100 \times 10^{-7}/°$ C. averaged over a range from 20° C. to 300° C. Alternatively or additionally, the strain point of the glass filler material 112 may be greater than the strain point of the glass core layer which may similarly result in the desired strengthening of the edge of the laminated glass article as a result of the methods described herein.

The glass filler material 112 is positioned in the channel 108 such that the glass filler material 112 does not completely fill the entire volume of the channel 108. This allows for portions of the sidewalls 110a, 110b to be folded over the glass filler material 112 and fused together, thereby forming an edge cap over the glass filler material and sealing the glass filler material 112 in the channel 108.

In some embodiments, the glass filler material 112 may be a glass fiber, as depicted in FIG. 4, or a plurality of glass fibers. Use of glass fibers as the glass filler material 112 permits the glass filler material to be easily conformed to and readily inserted into the channel 108. For example, a suitable glass fiber may have a coefficient of thermal expansion greater than or equal to about $50 \times 10^{-7}/°$ C. Alternatively, the glass fiber may have a coefficient of thermal expansion greater than or equal to about $80 \times 10^{-7}/°$ C. or even greater than or equal to about $100 \times 10^{-7}/°$ C.

Figure 5:
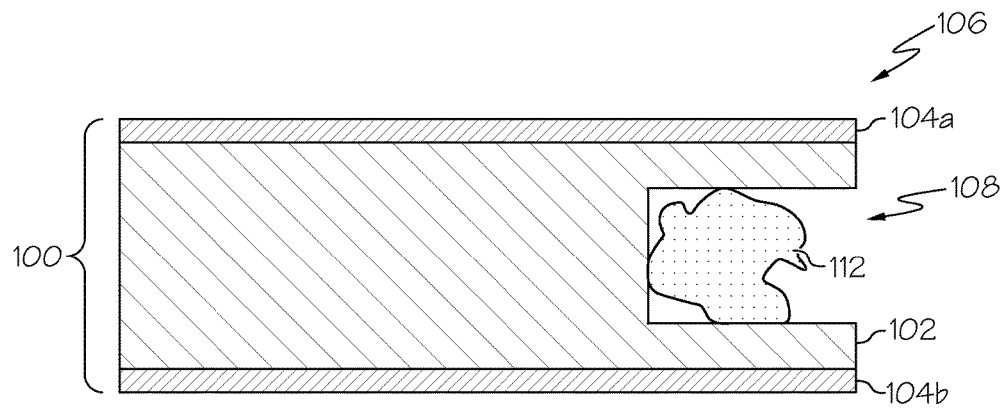
FIG. 5 schematically depicts the laminated glass article of FIG. 3 with a glass filler material, specifically a glass frit, disposed in the channel formed in the edge of the laminated glass article.

Alternatively, the glass filler material 112 may be a glass frit, as depicted in FIG. 5. The glass frit may be a loose glass frit, such as a powder, or a frit paste which includes a frit powder incorporated in an organic carrier to form an extrudable paste. Suitable glass frits include, without limitation glass frit having a coefficient of thermal expansion greater than or equal to about $50 \times 10^{-7}/°$ C. Alternatively, the glass frit may have a coefficient of thermal expansion greater than or equal to about $80 \times 10^{-7}/°$ C. or even greater than or equal to about $100 \times 10^{-7}/°$ C. In embodiments, the glass frit may be extruded into the channel 108 as a frit paste.

In some embodiments, prior to inserting the glass filler material 112 into the channel 108, the laminated glass article 100 may be preheated. Preheating the laminated glass article may be utilized to minimize the temperature differential between areas of the laminated glass article adjacent to the channel 108 that are subsequently further heated to beyond their softening point and those areas of the laminated glass article that are remote from the channel 108, thereby reducing the propensity of breakage due to a large temperature differential. In some embodiments, the laminated glass article 100 may be preheated to a temperature of greater than about 400° C. For example, in some embodiments, the laminated glass article 100 may be preheated to a temperature in a range from about 400° C. to about 600° C. However, it should be understood that other preheating temperatures may be used, including preheating temperatures less than about 400° C. and preheating temperatures greater than about 600° C. It should also be understood that, in some embodiments, the step of preheating the laminated glass article may be omitted.

Figure 6:
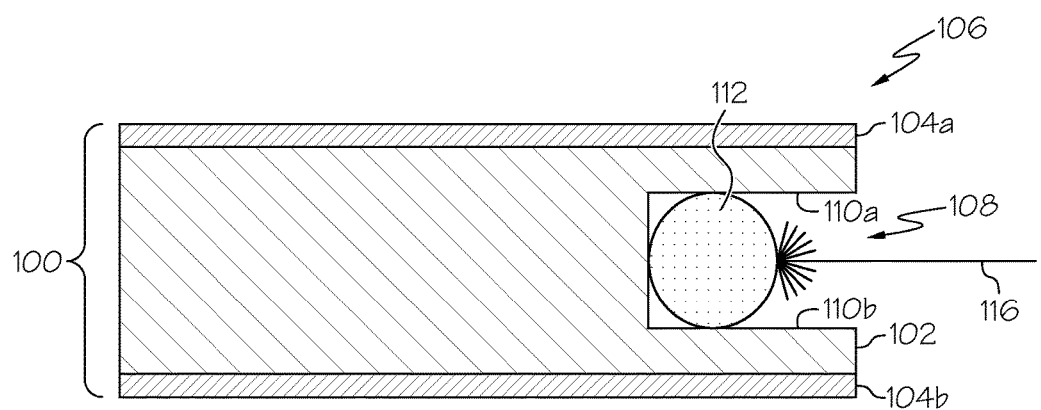
FIG. 6 schematically depicts one embodiment of a method for heating the glass filler material and the edge of the glass article to enclose the filler material within the channel.

Referring now to FIG. 6, once the glass filler material 112 is inserted into the channel 108 of the laminated glass article 100, the glass filler material 112 and portions of the glass clad layers 104a, 104b and the glass core layer 102 adjacent to the channel 108 are heated to a temperature above the softening point of the glass filler material 112, the glass clad layers 104a, 104b, and the glass core layer 102 to fuse the glass filler material 112 to the glass core layer 102 at the base of the channel 108 and to fuse the glass filler material 112 to the sidewalls 110a, 110b (i.e., to the glass core layer 102 forming the sidewalls 110a, 110b and/or the glass clad layers forming the sidewalls 110a, 110b). Heating the glass filler material 112 and portions of the glass clad layers 104a, 104b and the glass core layer 102 adjacent to the channel 108 to a temperature above their respective softening points facilitates manipulating and folding portions of the sidewalls 110a, 110b over the glass filler material 112 in the channel 108 to form and edge cap 130 (FIG. 8) over the glass filler material 112, thereby sealing the glass filler material 112 in the channel 108.

In one embodiment, the glass filler material 112 and portions of the glass clad layers 104a, 104b and the glass core layer 102 adjacent to the channel 108 are heated by directing a beam 116 of a laser source (not shown) directly onto the glass filler material 112 positioned in the channel 108, as depicted in FIG. 6. This technique heats the areas surrounding the glass filler material 112 (i.e., the glass core layer 102 at the base of the channel 108 and the sidewalls 110a, 110b) by convection and conduction, ultimately fusing the glass filler material 112 to the glass core layer 102 and the sidewalls 110a, 110b of the channel 108.

Figure 7:
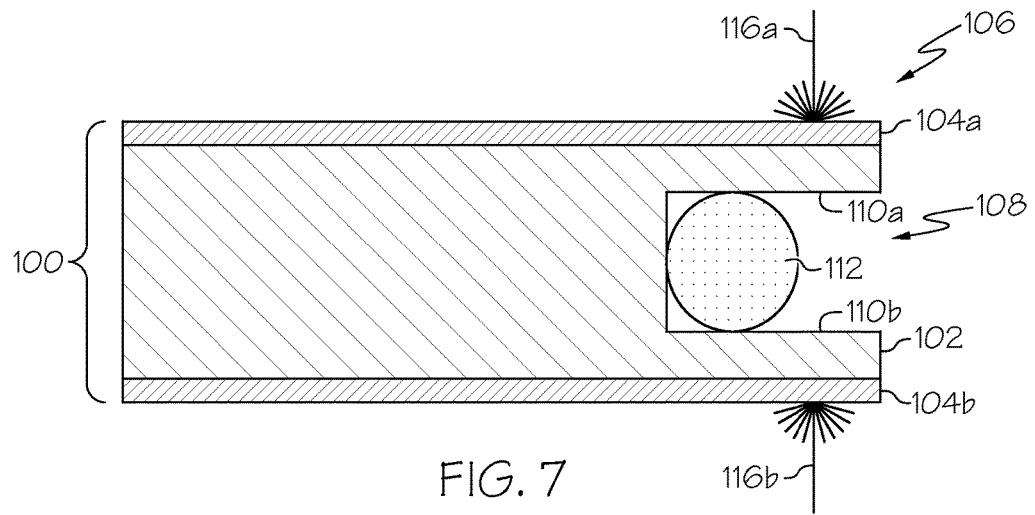
FIG. 7 schematically depicts another embodiment of a method for heating the glass filler material and the edge of the glass article to enclose the filler material within the channel.

Referring now to FIG. 7, in an alternative embodiment, the glass filler material 112 and portions of the glass clad layers 104a, 104b and the glass core layer 102 adjacent to the channel 108 are heated by directing a pair of beams 116a, 116b from one or more laser sources (not shown) onto the surface of the glass clad layers 104a, 104b adjacent to the channel 108. This technique heats and softens the sidewalls 110a, 110b of the channel 108 and heats and softens the glass filler material 112 positioned in the channel and the glass core layer 102 at the base of the channel 108 by convection and conduction, ultimately fusing the glass filler material 112 to the glass core layer 102 and the sidewalls 110a, 110b of the channel 108.

In the embodiments shown and described herein, heating of the glass filler material 112 and portions of the glass clad layers 104a, 104b and the glass core layer 102 adjacent to the channel 108 is accomplished using the beam of a $CO_2$ laser having a wavelength of 10.6 μm and a power from about 20 Watts to about 30 Watts. However, it should be understood that other laser sources for heating the glass filler material 112 and portions of the glass clad layers 104a, 104b and the glass core layer 102 adjacent to the channel 108 are possible and contemplated. In embodiments, the laser source and beam are held stationary during the heating process and the laminated glass article 100 is moved relative to the beam at a velocity of approximately 5 mm/second. While laser heating is described herein, it should be understood that other techniques for heating the glass filler material 112 and portions of the glass clad layers 104a, 104b and the glass core layer 102 adjacent to the channel 108 are contemplated and possible including, without limitation, radiative heating using a high temperature heating element.

Figure 8A:
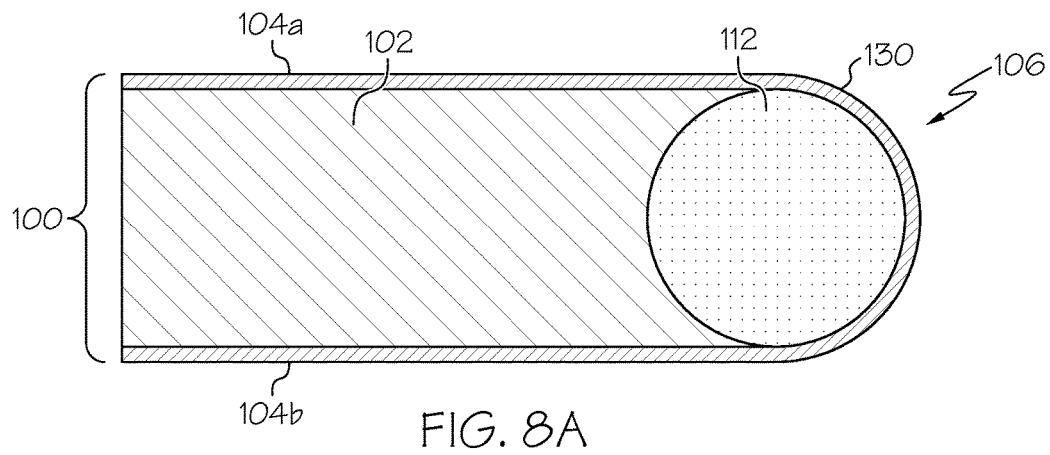
FIG. 8a schematically depicts one embodiment of a laminated glass article with glass filler material sealed in the channel with an edge cap.

Referring now to both FIGS. 6-7 and FIG. 8a, as the laser beam 116 (or laser beams 116a, 116b) heat and soften the glass filler material 112 and portions of the glass clad layers 104a, 104b and the glass core layer 102 adjacent to the channel 108, the portions of the glass clad layers 104a, 104b forming the sidewalls 110a, 110b of the channel 108 begin to soften and fold over the glass filler material 112, enclosing and sealing the glass filler material 112 within the channel 108. The portions of the glass clad layers 104a, 104b which fold over the glass filler material 112 contact one another and fuse together, forming an edge cap 130 which is continuous with and bridges glass clad layer 104a and glass clad layer 104b, as shown in FIG. 8a.

Figure 8B:
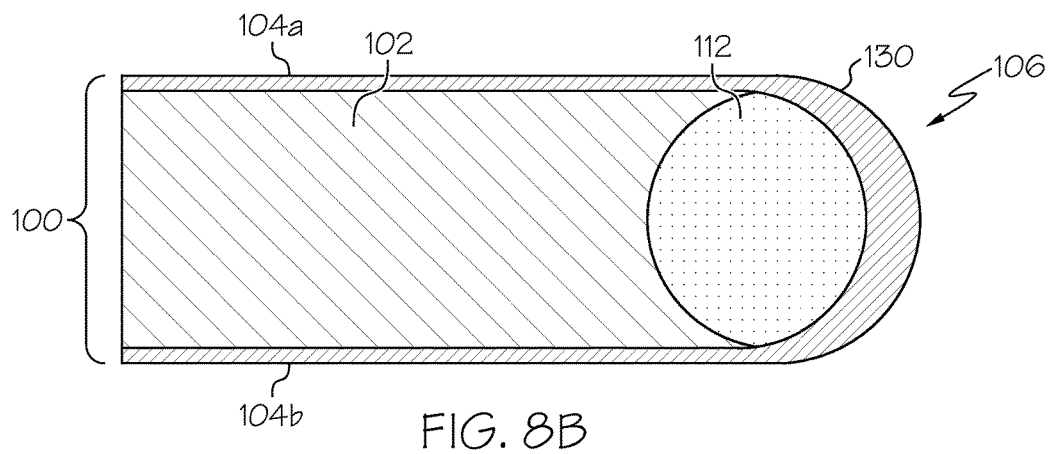
FIG. 8b schematically depicts another embodiment of a laminated glass article with glass filler material sealed in the channel with an edge cap.

Referring now to FIG. 8b, in some embodiments, the depth d and width W of the channel 108 may be such that the portions of the glass clad layers 104a, 104b which fold over the glass filler material 112 upon heating actually overlap one another when forming the edge cap 130 which, as with the edge cap shown in FIG. 8a, is continuous with and bridges glass clad layer 104a and glass clad layer 104b. In this embodiment, the overlap of the glass clad layer 104a and the glass clad layer 104b increases the thickness of the edge cap 130, improving the impact resistance of the edge 106 of the laminated glass article. Accordingly, in this embodiment, it should be understood that a maximum thickness of the edge cap 130 is greater than a maximum thickness of either the first glass clad layer 104a or the second glass clad layer 104b.

Referring to both FIGS. 8a and 8b, the glass filler material 112 is fused to the glass core layer 102, the glass clad layers 104a, 104b, and the edge cap 130. As the laminated glass article 100 cools following heating, the difference in the coefficient of thermal expansion between the glass filler material 112 and the glass core layer 102 causes a zone of compressive stress to develop in the glass core layer 102 starting at the interface between the glass core layer 102 and the glass filler material 112 and extending into the bulk of the glass core layer 102. In addition, the difference in the coefficient of thermal expansion between the glass filler material 112 and the glass clad layers 104a, 104b and the edge cap 130 (which has the same coefficient of thermal expansion as the glass clad layers) causes a zone of compressive stress to develop in the glass clad layers 104a, 104b and the edge cap 130 starting at the interface between the glass filler material 112 with the glass clad layers 104a, 104b and the edge cap 130 and extending through the thickness of the glass clad layers 104a, 104b and the edge cap 130. The bulk of the glass filler material 112 is generally in tension upon cooling.

After cooling, the magnitude of the compressive stress in the glass clad layers 104a, 104b and the edge cap 130 is generally greater than the magnitude of compressive stress which develops in the glass core layer 102 adjacent to the interface with the glass filler material 112. This increase in magnitude is due to the greater difference in CTE between the glass clad layers 104a, 104b and the glass filler material 112. It also is believed that the magnitude of compressive stress imparted to the glass clad layers 104a, 104b and the edge cap 130 due to the glass filler material 112 is greater than the compressive stress achievable in the edges of laminated glass articles using conventional edge processing techniques without the incorporation of a tertiary glass material, such as the glass filler material 112. Accordingly, the methods described herein may be utilized to improve the edge strength of laminated glass articles. The method described herein also may be utilized to improve the impact resistance of the edges of laminated glass articles by providing a thickened cladding layer at the edge of the laminated glass article.

EXAMPLES

The embodiments described herein will be further clarified by the following examples.

Example 1

Finite element model simulations of the strength obtained by an alternative edge processing method and the edge processing method according to the methods described herein were developed to demonstrate the improvement in the magnitude of compression in the edge cap formed by the methods described herein. As used herein, the phrase "alternative edge processing method" refers to the method of processing the edge of a laminated glass article by forming a channel in the core layer of the laminated glass article and heating the edge with a laser beam such that the glass cladding layer on one side of the glass core layer is fused to the glass cladding layer on the opposing surface of the glass core layer, closing the channel and effectively forming an edge cap. However, in the alternative edge processing method, a glass filler material with a CTE greater than the glass core layer is not used.

The compressive stresses developed in a laminated glass article using the alternative edge processing method were based on a laminated glass article modeled with glass clad layers having an elastic modulus of 73.8 GPa, a Poisson ratio of 0.23, and a CTE of $31.7 \times 10^{-7}/°$ C. The glass core layer of the laminated glass article was modeled with an elastic modulus of 72 GPa, a Poisson ratio of 0.22, and a CTE of $81.4 \times 10^{-7}/°$ C.

The compressive stresses developed in a laminated glass article using the edge processing techniques described herein were based on a laminated glass article modeled with glass clad layers having an elastic modulus of 73.8 GPa, a Poisson ratio of 0.23, and a CTE of $31.7 \times 10^{-7}/°$ C. The glass core layer of the laminated glass article was modeled with an elastic modulus of 72 GPa, a Poisson ratio of 0.22, and a CTE of $81.4 \times 10^{-7}/°$ C. The glass filler material used in the laminated glass article was modeled with an elastic modulus of 72 GPa, a Poisson ratio of 0.22, and a CTE of $100 \times 10^{-7}/°$ C.

Figure 10A:
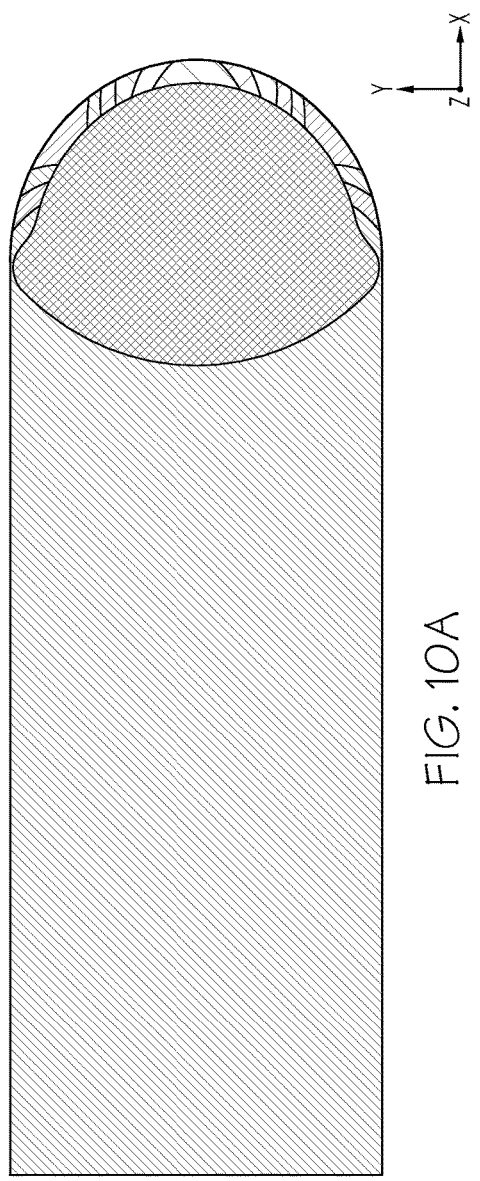
FIGS. 10a and 10b graphically depict a map of the axial stresses in the y-direction for a laminated glass article processed according to conventional edge processing techniques (FIG. 10a) and edge processing techniques according to one or more embodiments shown and described herein (FIG. 10b)
Figure 10B:
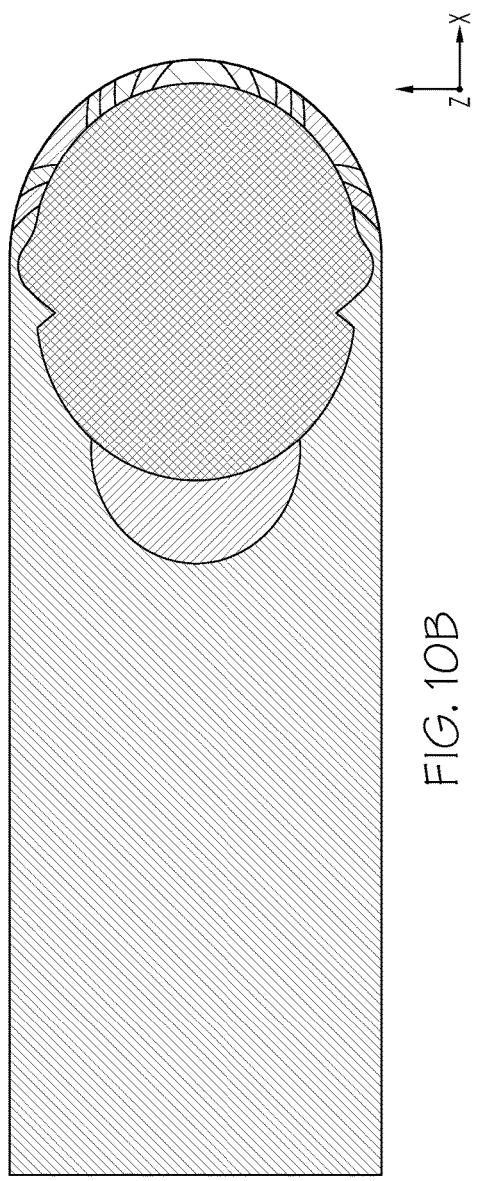

The axial compressive and tensile stresses in the laminated glass articles modeled according to the alternative edge processing method and the edge processing techniques described herein were determined for each of the x, y, and z directions. FIGS. 9a and 9b graphically depict a map of the axial stresses in the x-direction for a laminated glass article processed according to the alternative edge processing method (FIG. 9a) and the edge processing techniques described herein (FIG. 9b); FIGS. 10a and 10b graphically depict a map of the axial stresses in the y-direction for a laminated glass article processed according to the alternative edge processing method (FIG. 10a) and the edge processing techniques described herein (FIG. 10b); and FIGS. 11a and 11b graphically depict a map of the axial stresses in the z-direction for a laminated glass article processed according to the alternative edge processing method (FIG. 11a) and the edge processing techniques described herein (FIG. 11b).

FIGS. 11a and 11b demonstrate that the compressive stresses in the edge cap in the z-direction of a laminated glass article produced according to the embodiments described herein increased by approximately 20% relative to the compressive stresses in the edge cap of a laminated glass article produced according to the alternative edge processing method. Similarly, FIGS. 10a and 10b demonstrate that the compressive stresses in the edge cap in the y-direction of a laminated glass article produced according to the embodiments described herein increased by approximately 40% relative to the compressive stresses in the edge cap of a laminated glass article produced according to the alternative edge processing method.

It should now be understood that the embodiments described herein relate to methods for forming laminated glass articles and, more specifically, to methods for forming laminated glass articles with improved edge strength and laminated glass articles formed thereby. Strengthening the edge of the laminated glass article involves forming a channel in the glass core layer of the laminated glass article and inserting a glass filler material in the channel. The glass filler material has a filler coefficient of thermal expansion $CTE_F$ which is greater than the core coefficient of thermal expansion $CTE_C$ and the clad coefficient of thermal expansion $CTE_{CL}$. The glass filler material and adjacent portions of the glass core layer and glass clad layers are then heated to fuse the glass filler material to the glass core layer and the glass clad layers and to seal the glass filler material in the channel by forming an edge cap from the glass clad layers.

The relative difference in the coefficients of thermal expansion between the glass filler material, the glass core layer, and the glass clad layers imparts the laminated glass article with a unique residual stress profile which enhances the edge strength of the laminated glass article. Specifically, the resulting laminated glass article includes a zone of compressive stress which extends through the thickness of the edge cap enclosing the glass filler material in the channel.

The laminated glass articles described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for strengthening an edge of a glass laminate, the method comprising:
    positioning a glass filler material in a channel in the edge of the glass laminate, the glass laminate comprising a glass core layer positioned between a first glass clad layer and a second glass clad layer, sidewalls of the channel being formed from at least a portion of the first glass clad layer and at least a portion of the second glass clad layer, the glass filler material having a filler coefficient of thermal expansion $CTE_F$ that is greater than a core coefficient of thermal expansion $CTE_C$ of the glass core layer;
    heating the glass filler material and the sidewalls of the channel to a temperature greater than or equal to a softening temperature of the glass filler material and greater than or equal to a softening temperature of the sidewalls; and
    enclosing the glass filler material in the channel by joining the sidewalls and fusing at least a portion of the first glass clad layer to at least a portion of the second glass clad layer thereby forming an edge cap over the channel, wherein the edge cap is under compressive stress.

2. The method of claim 1, further comprising forming the channel in the edge of the glass laminate prior to positioning the glass filler material in the channel.

3. The method of claim 1, wherein the glass filler material is enclosed in the channel by overlapping at least a portion of the first glass clad layer with at least a portion of the second glass clad layer.

4. The method of claim 1, wherein a maximum thickness of the edge cap is greater than a maximum thickness of either the first glass clad layer or the second glass clad layer.

5. The method of claim 1, wherein the glass filler material comprises a glass fiber.

6. The method of claim 1, wherein the glass filler material comprises a glass frit.

7. The method of claim 1, wherein the first glass clad layer and the second glass clad layer have a clad coefficient of thermal expansion $CTE_{CL}$ and $CTE_F > CTE_C > CTE_{CL}$.

8. The method of claim 1, wherein heating the glass filler material and the sidewalls of the channel comprises directing a laser beam onto the glass filler material positioned in the channel.

9. The method of claim 1, wherein heating the glass filler material and the sidewalls of the channel comprises directing a first laser beam onto a surface of the first glass clad layer adjacent to the channel and directing a second laser beam onto a surface of the second glass clad layer adjacent to the channel.

10. A laminated glass article comprising:
a glass core layer having a core coefficient of thermal expansion $CTE_C$;
a first glass clad layer fused directly to a first surface of the glass core layer;
a second glass clad layer fused directly to a second surface of the glass core layer opposite the first surface, the first glass clad layer and the second glass clad layer fused to one another adjacent an edge of the glass core layer forming an edge cap that encloses at least a portion of the edge of the glass core layer; and
a glass filler material having a filler coefficient of thermal expansion $CTE_F$ and positioned between the edge of the glass core layer and the edge cap, the glass filler material fused to the glass core layer and the edge cap, wherein $CTE_F > CTE_C$.

11. The laminated glass article of claim 10, wherein the first glass clad layer and the second glass clad layer have a clad coefficient of thermal expansion $CTE_{CL}$ and $CTE_F > CTE_C > CTE_{CL}$.

12. The laminated glass article of claim 10, wherein the edge cap is formed by an overlap of the first glass clad layer and the second glass clad layer.

13. The laminated glass article of claim 10, wherein a maximum thickness of the edge cap is greater than a maximum thickness of either the first glass clad layer or the second glass clad layer.

14. The laminated glass article of claim 10, wherein the glass filler material comprises a glass fiber.

15. The laminated glass article of claim 10, wherein the glass filler material comprises a glass frit.

16. The laminated glass article of claim 10, wherein the glass core layer has a region of compressive stress extending from an interface of the glass core layer with the glass filler material into a bulk of the glass core layer.

17. The laminated glass article of claim 10, wherein the edge cap has a region of compressive stress extending through a thickness of the edge cap.

18. Use of the laminated glass article of claim 10 for cover glass or glass backplane applications in consumer or commercial electronic devices, touch screen or touch sensor applications, integrated circuit applications, photovoltaic applications, architectural glass applications, automotive or vehicular glass applications, commercial or household appliance applications, lighting or signage applications, or transportation applications.

* * * * *